United States Patent [19]

Miller et al.

[11] 3,951,336
[45] Apr. 20, 1976

[54] VENTILATION SYSTEM FOR LIVESTOCK HOUSING

[75] Inventors: Loren C. Miller, Warsaw; Kenneth G. Walsh, Fort Wayne, both of Ind.

[73] Assignee: Miller and Sons Structures, Inc., Silver Lake, Ind.

[22] Filed: Aug. 28, 1974

[21] Appl. No.: 501,273

[52] U.S. Cl. ............................... 98/1.5; 98/33 R; 98/41 R; 119/16; 236/49
[51] Int. Cl.² ....................... F24F 3/10; F24F 11/00
[58] Field of Search ................. 236/49; 98/33 R, 42, 98/1.5, 41, 47; 160/1; 49/31; 119/16

[56] References Cited
UNITED STATES PATENTS

| | | | |
|---|---|---|---|
| 551,889 | 12/1895 | Chadborn | 98/42 X |
| 2,139,344 | 12/1938 | Andersen | 236/1 E |
| 3,207,055 | 9/1965 | Small | 98/43 X |
| 3,511,161 | 5/1970 | Schindelman | 98/1.5 |
| 3,601,030 | 8/1971 | Bryant | 98/32 |
| 3,611,906 | 10/1971 | Lorenz | 98/33 R |
| 3,646,877 | 3/1972 | Ellis | 98/110 |
| 3,706,271 | 12/1972 | Mieczkowski | 98/41 R |
| 3,752,208 | 8/1973 | Roberts | 160/1 |
| 3,802,479 | 4/1974 | Newell et al. | 160/1 |
| 3,808,960 | 5/1974 | Van Huis | 98/41 R |

*Primary Examiner*—William E. Wayner
*Attorney, Agent, or Firm*—Woodhams, Blanchard and Flynn

[57] ABSTRACT

A ventilation system for a livestock building to provide a controlled environment therein. The ventilation system includes one or more exhaust fans for withdrawing air from the building, and also includes a controllable baffle system for permitting fresh air to flow into the building. The baffle system includes movable baffles disposed for closing openings formed in the building, which openings are located in the ceiling or in the sidewalls adjacent the upper edges thereof. A drive mechanism is connected to the baffles for moving same between open and closed positions. The drive mechanism is actuated by a pressure sensing device which senses the pressure differential between the pressure on the inside of the building and the atmospheric pressure which exists outside the building. The sensing device maintains the pressure in the building at a level which is slightly below atmospheric pressure. When the pressure in the building falls below this level, then the drive device is automatically energized to open the baffles to permit the inflow of air accompanied by the discharge of air through the exhaust fan. Similarly, when the pressure in the building exceeds this level, then the drive device is energized to close the baffles. The exhaust fans are preferably controlled by thermostatic switches which cause the air in the building to be changed when a preselected temperature is exceeded.

11 Claims, 4 Drawing Figures

VENTILATION SYSTEM FOR LIVESTOCK HOUSING

FIELD OF THE INVENTION

This invention relates to an improved ventilation system for a building used for livestock and poultry and, in particular, to a ventilation system which provides a controlled environment within the building.

BACKGROUND OF THE INVENTION

The poultry and livestock industry is rapidly adopting the confined, environment controlled, isolated unit approach for the managing and raising of poultry and livestock. This approach, wherein the poultry or livestock is continuously confined within a building, is desirable from the standpoint of providing improved working conditions for the caretaker of the animals, and at the same time is also believed to result in greater growth or productivity. However, confinement of the animals has also produced or assisted in the development of disease conditions which were seldom seen previously. Further, improper ventilation can result in accumulation of excessive moisture which encourages the proliferation or build-up of disease producing bacterial organisms. Thus, under confined conditions, the maintaining of acceptable air temperature, humidity, ventilation and air purity is essential if the animals are to remain healthy and are to have maximum growth or productivity.

The maintaining of proper environmental conditions within the confinement is particularly critical for animals such as swine. For growing swine, the optimum air temperature is normally 50°-60° F, since at these temperatures the swine will use little feed to keep warm and will usually want to eat at a high rate, thereby resulting in maximum weight gain. However, at higher temperatures, swine do not eat as much feed, and do not gain as rapidly. On the other hand, at lower temperatures, some of the feed nutrients must be used to produce body heat and therefore weight gain is reduced. Thus, the control of confinement temperature is essential in order to result in optimum growth of the swine.

Further, control over humidity in the confinement is also essential and critical since the humidity should be between 50 and 80 percent in order to provide for optimum health of the swine. Both high and low humidities may cause respiratory problems which severely effect the swine, particularly since swine are susceptible to flu and similar diseases during the fall and spring seasons. The control over the humidity within the confinement, and the continual and rapid changing of air within the confinement, is thus essential if the spreading of respiratory diseases such as flu are to be avoided.

In an attempt to provide a controlled environment within a livestock confinement, various systems have been devised. Most of these systems have utilized fans either for forcing air into the confinement or for removing air from the confinement. However, the overall arrangement of these known systems has not resulted in close control over the environment within the confinement, since these systems have not permitted a large number of air changes to be made within the confinement, nor have these systems permitted air changes to be made without resulting in excessive drafts or temperature changes within the confinement.

Accordingly, it is an object of the present invention to provide an improved ventilation system for use with a livestock confinement for permitting precise control over the environment within the confinement. In particular, it is an object of the present invention to provide an improved ventilation system which permits precise control over the confinement temperature and also permits a large number of air changes to be made per unit of time so as to control both air purity and humidity, which air changes can be made in a manner which minimizes the intake air velocity to thus substantially eliminate drafts within the confinement.

A further object of the present invention is the provision of an improved ventilation system which maintains a preselected pressure differential between the confinement pressure and the atmospheric pressure, with the intake ventilation system being automatically and variably controlled in response to the variation of the confinement pressure from a preselected level so as to permit controlled amounts of air to be supplied to the confinement.

Other objects and purposes of the present invention will be apparent to persons acquainted with structures of this general type upon reading the following specification and inspecting the accompanying drawings.

Figure 1:
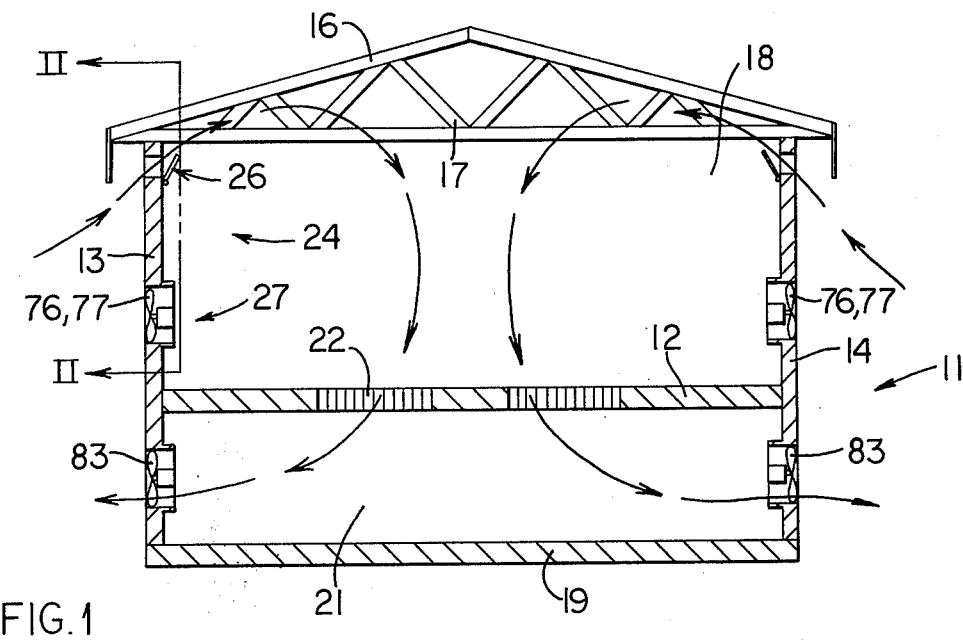
FIG. 1 is a sectional elevational view of a livestock confinement incorporating therein an improved ventilation system according to the present invention.

Certain terminology will be used in the following description for convenience and reference only, and will not be limiting. For example, the words "upwardly", "downwardly", "rightwardly" and "leftwardly" will refer to directions in the drawings to which reference is made. The words "inward" and "outward" will refer to directions toward and away from, respectively, the geometric center of the system and designated parts thereof. Said terminology includes the words above specifically mentioned, derivatives thereof and words of similar import.

SUMMARY OF THE INVENTION

The objects and purposes of the present invention are met by providing a livestock confinement having one or more fans which are preferably mounted in the sidewalls of the building for permitting the supplying of air to or from the building. The building is also provided with one or more openings, preferably adjacent the upper edges of the sidewalls, which are closed by movable baffles. The baffles are movable into an open position by a drive mechanism which includes a driving motor. The energization of the driving motor is controlled by a pressure sensor which senses the pressure differential between the atmosphere within the building and the atmosphere exteriorly of the building. The motor is energized to open or close the baffles only when the pressure sensor indicates that the pressure differential is outside of a preselected range. At least some of the fans are automatically activated by a temperature sensing switch to supply air to or from the building when the temperature within the building reaches a preselected level.

DETAILED DESCRIPTION OF THE DRAWINGS

FIG. 1 illustrates therein a conventional livestock confinement of building 11, such as for use with swine, cattle or the like, which building incorporates therein an improved ventilation system according to the present invention.

The building 11 includes an animal support floor 12 which extends between a plurality of upwardly extending sidewalls, only the sidewalls 13 and 14 being illustrated in the drawings. The building 11 is closed by a roof 16 which is supported on conventional truss members 17, thereby resulting in the formation of an animal storage space 18. The building 11 also has a bottom wall 19 which is spaced downwardly from the animal support floor 12 and defines therebetween a servicing and ventilation space 21, which space communicates with the storage space 18 by means of floor grates 22. The building 11 has an improved ventilation system 24 associated therewith, which ventilation system includes an intake system 26 for permitting the supplying of fresh air into the building and an exhaust system 27 for the discharge of air from the building. These systems will be considered individually hereinafter.

Figure 3:
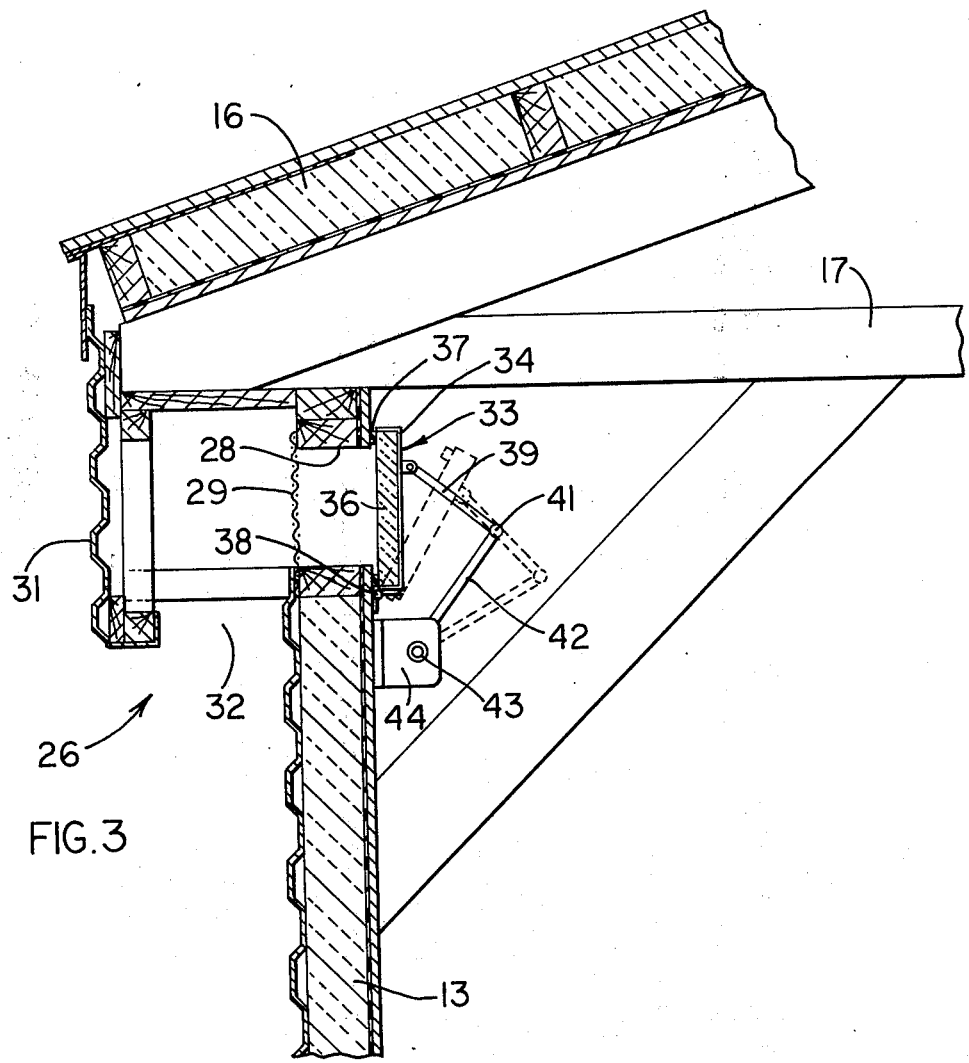
FIG. 3 is an enlarged fragmentary sectional view taken substantially along the line III—III in FIG. 2.

Considering first the intake system 26, same includes an elongated opening 28 formed in some or all of the building sidewalls, openings 28 are preferably located adjacent the upper edge of the opposite sidewalls (as shown in FIG. 1) and extend throughout substantially the length thereof. The opening 28 is preferably provided with a conventional screen 29 thereon. The building 11, as illustrated in FIG. 3, is also preferably provided with an overhanging roof, the outer edge of which is provided with an overhanging wall 31 which projects downwardly beyond the window 28 but is spaced outwardly therefrom, thereby defining an opening 32 for permitting the free flow of air into the opening 28.

The opening 28 is adapted to be opened or closed by a movable baffle 33 which is mounted on and disposed adjacent the inner surface of the respective sidewall. The baffle 33, in the illustrated embodiment, comprises a boxlike housing 34 constructed of sheet metal and having an insulating layer 36 positioned therein, which insulating layer 36 preferably comprises a lightweight foamed plastic. Suitable resilient sealing strips 37 are affixed to the face of the baffle and are adapted to sealingly engage the inner surface of the sidewall when the baffle is closed. The baffle 33 has the lower edge thereof connected to the respective sidewall by a hinge 38 to permit same to be swingably moved between closed and open positions as respectively illustrated by solid and dotted lines in FIG. 3.

The movement of the baffle 33 is controlled by a linkage which includes an intermediate link 39 having one end thereof hingedly connected to the baffle 33 and the other end thereof connected, as by a hinge 41, to the outer free end of a crank 42. The crank 42 is fixedly connected to an elongated shaft 43 which is disposed adjacent and extends substantially parallel with the inner surface of the sidewall, such as by being rotatably supported on a plurality of brackets 44 which are affixed to said sidewalls at spaced locations therealong.

The shaft 43 is driven by a drive mechanism 46 (FIG. 4) including a conventional power unit 47 (Barber-Colman actuator MP 481-0-0-1), which power unit has a reversal electric motor, a gear reducer and a brake. A driving crank 48 is fixedly secured to the end of the rotatable output shaft 49 associated with the power unit 47. An intermediate connecting rod 51 has one end thereof hingedly connected to the free end of the crank 48, and has the other end thereof hingedly connected to the free end of a further crank 52 which is fixedly secured to a shaft 53. The shaft 53 is disposed in substantial coaxial alignment with the shaft 43 and is also rotatably supported on barracks similar to the brackets 44. The shaft 53 is normally drivingly connected to the shaft 43 by an electromagnetic clutch 54, which clutch is continuously maintained in an energized condition so as to cause continuous driving engagement between the shafts 43 and 53.

The above-described linkage for driving the baffle 33, which linkage includes the link 39, crank 42, shaft 43 and drive mechanism 46, thus provides for a positive driving of the baffle in both the opening and closing direction. This positive driving of the baffle, in either direction, accordingly permits for precise control over the movement of the baffle and hence the quantity of air permitted to flow through the opening 28.

The drive mechanism 46 is associated with a control means 56 which includes electrical conductors 57, 58 and 59 which are associated with the power unit 47 (and specifically the reversible electric motor therein) for controlling the energization thereof. The connectors 57, 58 and 59 are associated with conventional electromagnetic relays 61 and 62 which are connected to a stepdown transformer 63, which in turn is connected to an electrical energy source 64, normally a conventional 110-volt alternating current source. The relays 61 and 62 control the rotation of the motor associated with the power unit 47 in opposite directions, and the power unit 47 further has internal limit switches (not shown) associated therewith for limiting the angular extent through which the crank 48 is driven by the motor.

Figure 4:
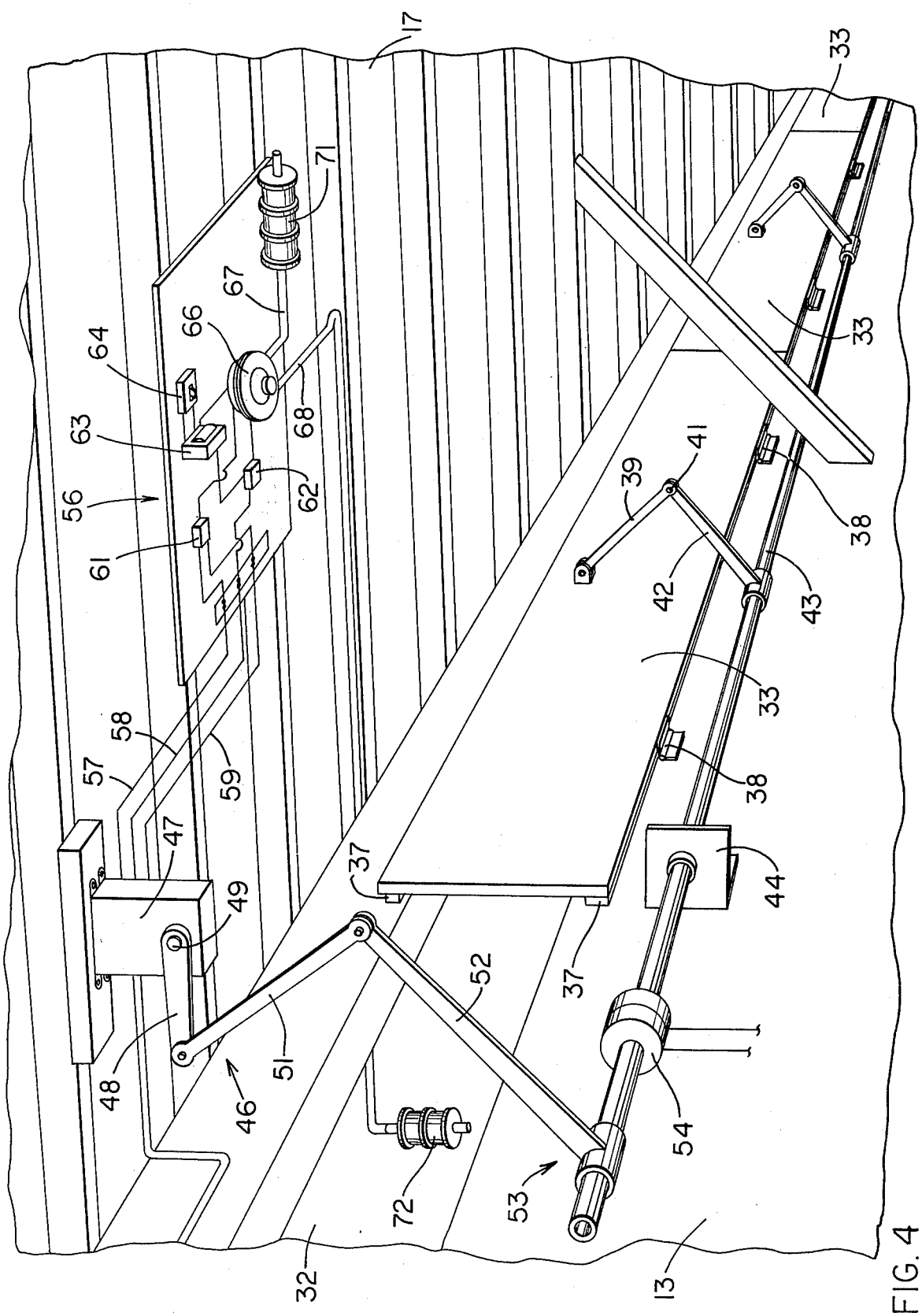
FIG. 4 is a perspective view illustrating a portion of the improved ventilation system.

The initiation of swinging movement of the baffle 33, either the initiation of opening or closing movement thereof, is controlled by switch means 66 which is electrically connected to the transformer 63 and controls the energization of the relays 61 and 62. Switch means 66 preferably comprises a conventional vacuum pressure switch (Barber-Colman Switch No. 190140-01) of the type having a movable pressure responsive diaphragm positioned between two fluid chambers, whereby the movement of the diaphragm in response to the pressure differential thereacross causes an appropriate switching movement. As illustrated in FIG. 4, one of the chambers of the vacuum pressure switch 66 is connected to a tubular conduit 67 and the other chamber of the switch 66 is connected to a further tubular conduit 68. The conduits 67 and 68 in turn are respectively connected to pressure sensors 71 and 72. The sensor 71 is disposed within the animal storage space 18 so as to indicate the pressure of the air within the building, whereas the sensor 72 is disclosed exteriorly within the building so as to be responsive to the pressure of the atmosphere surrounding the building. The pressure sensors 71 and 72 may be of any conventional type, and are illustrated as hollow plastic members.

Figure 2:
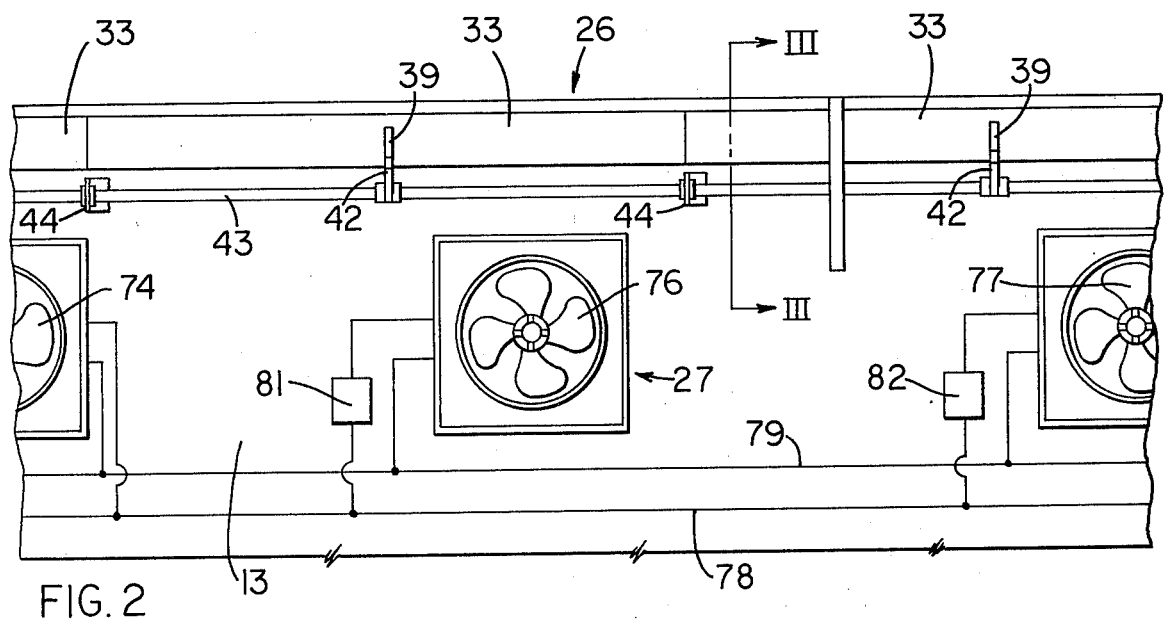
FIG. 2 is an enlarged fragmentary view taken substantially along the line II—II in FIG. 1.

Considering now the exhaust system 27, and referring particularly to FIG. 2, same includes one or more convenntional exhaust fans 76 mounted on the sidewalls of the building for permitting withdrawal of air from the animal storage space 18. In the present invention, the exhaust system 27 includes a first exhaust fan 76 mounted in the sidewall 13 and communicating directly with the space 18. The fan 76 is energized from conventional electric conduits 78 and 79, with the energization of the fan 76 being controlled by a conventional thermostatic switch 81 which permits energization of the fan 76 only when the temperature in the space 18 exceeds a preselected magnitude. The exhaust system 27 may also include additional exhaust fans mounted in the sidewalls so as to permit withdrawal of the desired quantities of air from the building. An additional exhaust fan 77 is illustrated in FIG. 2, which fan may be energized simultaneously with the fan 76. Alternately, the fan 77 may be controlled by a separate thermostatic switch 82 which is set at a higher temperature so that the fan 77 will be energized only when the temperature within the space 18 exceeds a second magnitude which is greater than the temperature setting of the switch 81. A further exhaust fan 74 is shown in FIG. 2 and same is preferably continuously energized.

The exhaust system 27 also preferably includes still further exhaust fans 83 associated therewith, with fans are also located in the sidewalls of the building but are preferably disposed below the animal support floor 12 so as to communicate directly with the space 21. The exhaust fans 83 are also controlled by thermostatic switches, which switches are preferably adjusted to a lower temperature setting so that the fans 83 will be energized at a temperature which is lower than the temperature setting of the switch 81.

OPERATION

The operation of the ventilation system according to the present invention will be briefly described to insure a complete understanding thereof.

The ventilation system 24 of the present invention is designed to maintain the atmosphere within the animal storage space 18 at a pressure level which is slightly less than the atmospheric pressure which exists exteriorly of the building. Particularly, the system 24 is designed to maintain approximately a 0.05 inch of water gauge vacuum within the building, which pressure is maintained within ± 0.02 inch of water gauge. In order to maintain this desired vacuum within the building, and particularly within the animal storage space 18, the pressure sensors 71 and 72 measure the pressure differential which exists interiorly and exteriorly of the building, and this pressure differential is imposed on the movable diaphragm associated with the vacuum switch 66 to thereby control the opening and closing movement of the baffle 33. Under normal conditions, the baffle 33 will be in a partially opened position, and all of the exhaust fans will be de-energized except for fan 74 which is normally continuously energized. The fan 74 supplies the minimum air change necessary to sustain life in the building, yet produces the 0.05 inches of water vacuum necessary to produce draft-free air movement. In this condition, the pressure differential as imposed on the diaphragm associated with the vacuum switch 66 holds same in a neutral condition.

When the temperature within the building exceeds the temperature setting of the thermostatic switch associated with the exhaust fans 83, then these fans will be energized and will cause the air within the building to be discharged externally thereof. This tends to decrease the pressure within the building so that the pressure differential as imposed on the vacuum switch 66 by the sensors 71 and 72 thus increases. This increased pressure differential causes movement of the diaphragm associated with the switch 66, thereby causing the contacts associated with the switch 66 to close. This results in energization of the relay 61 which in turn causes energization of the motor associated with the power unit 47. This results in rotation of the drive shaft 49 which, through the link 51 and crank 52, causes a corresponding rotation of the shaft 53. Since electromagnetic clutch 54 is continually energized, shaft 43 is rotated synchronously with the shaft 53 whereby the baffle 33 is swung outwardly away from the opening so as to assume a more fully opened position substantially as illustrated by dotted lines in FIG. 3. This opening of the baffle 33 permits sufficient air to be drawn into the building through the opening 28 to compensate for the air which is being discharged from the building by the exhaust fans 74 and 83. The power unit 47 will remain energized and will cause the baffle 33 to continue to swing outwardly away from the window 28 to thereby increase the opening area until sufficient air is flowing into the building so as to result in an increase in the pressure of the air within the building. In this manner, the inflowing air causes the pressure differential interiorly and exteriorly of the building to decrease so that when the desired differential is again achieved, then this desired pressure differential as sensed by the sensors 71 and 72 causes the diaphragm of the switch 66 to return to its neutral position, thereby de-energizing the relay 61 and likewise de-energizing the power unit motor. A holding brake associated with the power unit 47 immediately engages and thereby holds the output shaft 49 and the crank 48 associated therewith in a stationary position, thereby resulting in the baffle 33 being held in an opened position.

When the air being supplied into the building through the opening 28 causes the temperature within the building to drop below the setting of the thermostatic switch associated with the fans 83, then these fans will be automatically de-energized. As soon as these fans 83 are de-energized, then the continual inflow of air through the opening 28 causes the pressure within the building to rise, since the pressure within the building will attempt to equalize with the atmospheric pressure existing exteriorly of the building. This thus decreases the pressure differential which exists interiorly and exteriorly of the building, which pressure differential is again transmitted by the sensors 71 and 72 to the diaphragm associated with the switch 66. The diaphragm is then moved in the opposite direction so as to energize a further set of contacts associated with the switch 66, which in turn results in energization of the relay 62. The relay 62 causes the motor of the power unit 47 to be energized and to rotate in the reverse direction, which rotation continues until the baffle 33 is partially closed. A limit switch associated with the motor then automatically de-energizes the power unit 47. At this time, baffle 33 is still partially open to permit sufficient inflow of air to compensate for the running of fan 74.

With the operation as described above, only the exhaust fans 83 associated with the space 21 are intermittently energized so that complete circulation is achieved throughout the building so as to result in a complete change of air therein while at the same time the velocity of the air can be minimized. Further, since the air within the building flows through the grates 22 for discharge through the exhaust fans 83, the drafts produced within the space 18 are minimized. This mode of operation is generally utilized when the atmospheric temperature is low, such as during the winter.

However, during the summer months when the atmospheric temperatures are substantially higher, then additional cooling is needed within the building. In this situation the higher temperatures within the building result in the energization of additional exhaust fans. For example, the thermostatic switch 81 associated with the exhaust fan 76 is set for a higher temperature level than the thermostatic switch associated with the exhaust fans 83, so that the fan 76 will also be energized when a higher temperature is reached within the space 18. Both fans 76 and 83 will operate under this condition. With still higher temperatures, the switch 82 is also activated to energize the fan 77 to still further increase the air circulation within the building, thereby resulting in more rapid air changes within the building to maintain the temperature in space 18 at an optimum level.

Utilizing a system as disclosed above, it is possible to maintain the pressure within the animal storage space 18 at approximately 0.05 inches of water below the atmospheric pressure, and this pressure within the space 18 can be maintained within approximately ± 0.02 inches of water. Further, the system permits the intake velocity of the air as flowing through the opening 28 to be maintained at about 700 feet per minute, which is sufficient to permit the fresh air to flow throughout the interior of the building without being short circuited directly to the exhaust fans.

The system of the present invention does permit the air within the building to be changed several times each hour with the number of changes each hour being rapidly increased when the atmospheric temperature increases, as during summer months. Accordingly, both the temperature and the humidity within the building can be controlled as necessary in order to provide for optimum conditions within the building as necessary for the health, growth and productivity of the animals.

While the invention as described above is used for creating a partial vacuum within the confinement, nevertheless the inventive system is also equally applicable for creating a positive pressure within the confinement space 18. For example, in some situations, such as during hot weather, it is believed that the maintaining of a positive pressure differential between the building and the atmosphere is desirable. That is, the pressure within the confinement space 18 will be maintained at a level slightly greater than atmospheric pressure, which positive pressure differential may again be 0.05 inches of water gauge. When such a positive pressure differential is desired, then the numerous fans (such as the fans 74, 76, 77 and 83) are used as intake fans for blowing fresh air into the building, whereupon the baffle-controlled opening 28 is then utilized to permit the air within the building to be exhausted into the surrounding environment. The overall operation of the system when utilizing a positive pressure differential is thus identical to the operation when utilizing a negative or vacuum pressure differential except that the flow through the baffle openings and the fans is reversed.

The present invention, as described above, also incorporates a fail safe feature for permitting adequate supply of fresh air into the building in the event of a power failure. This fail safe feature is provided by means of the electromagnetic clutch 54 which is normally continuously energized so as to drivingly couple the shafts 43 and 53. If a power failure should occur, which would then prevent energization of the exhaust fans and the power unit, then the clutch 54 is automatically disengaged whereupon the weight of the baffles 33 act on the crank 42 and cause the shaft 43 to be swung downwardly so that the baffles 33 automatically swing into their fully open position. The opening 28 is thus automatically uncovered to permit fresh air to flow into the space 18. Alternately, the building can be provided with a separate baffle associated with an opening in the building, which baffle is normally maintained in a fully closed position by means of the linkage shown in FIG. 4. Thus, upon a power failure, the electromagnetic clutch 54 releases so as to permit the baffle to automatically open.

While the baffle 33 associated with the opening 28 along the length of the sidewall could be continuous if desired, from a practical standpoint same is preferably constructed from a plurality of baffles which are of shorter length, and each of which is associated with a substantially identical drive linkage including a link 38 and a crank 42. This structure greatly simplifies both the manufacture and installation of the system, and permits its adoption to building walls of varying lengths.

Further, while the baffles 36 have been disclosed as being controlled by an electric-motor driven mechanical linkage, it will be recognized that numerous other devices can be provided for controlling the opening and closing of the baffles. For example, the individual baffle members could be directly driven from motors, thereby eliminating the need for the elongated drive shaft 43. Alternately, the baffles could be controlled by pneumatic or hydraulic power units, such as fluid pressure motors, cylinders or the like.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An improved ventilation system for an agricultural building having a livestock confinement space therein, comprising:
    fan means providing for the flow of air between the lower region of said confinement space and the atmosphere outside of said building;
    air flow means for permitting air flow between said space and the atmosphere in the direction opposite to the flow caused by said fan means, said air flow means including opening means in a wall of said building for permitting communication between said atmosphere and the upper region of said confinement space;
    said air flow means also including movable baffle means disposed adjacent said opening means and movable for opening and closing said opening means, said baffle means being movable between a first position wherein said opening means is closed and a second position wherein said opening means is at least partially uncovered;
    drive means connected to said baffle means for moving same between said first and second positions, said drive means including motor means and link means connected between said motor means and said baffle means, said link means being capable of transmitting both tensile and compressive loads therethrough to positively control both the opening and closing movement of said baffle means;

sensing means including first means for sensing the pressure of the air within said confinement space and second means for sensing the pressure of the atmosphere outside the building;

control means directly responsive to the pressure differential sensed by said first and second means for causing energization of said drive means when the sensed pressure differential deviates from a preselected differential to cause opening or closing movement of said baffle means;

said building including a floor and an animal support surface spaced upwardly from the floor and defining a servicing space therebetween, said animal support surface having vent means therein for permitting communication between said confinement space and said servicing space;

said fan means including a first fan mounted in a sidewall of the building and communicating directly with said servicing space and a second fan mounted in the sidewall of the building and communicating directly with the confinement space; and switch means associated with said first and second fans for causing operation of only said first fan when the temperature in said confinement space is relatively low and for causing simultaneous operation of both said first and second fans when the temperature in said confinement space is relatively high.

2. A system according to claim 1, wherein said opening means is horizontally elongated and is formed in and extends longitudinally along the sidewall of the building adjacent the upper end thereof, and said link means including a horizontally elongated drive shaft disposed adjacent said opening means and extending in the longitudinal direction thereof, said drive shaft being drivingly connected to and driven from said motor means, and a plurality of linkages connected between said drive shaft and said baffle means for causing movement of said baffle means in response to rotation of said drive shaft, said linkages being connected to said drive shaft at axially spaced locations therealong.

3. A system according to claim 2, wherein said baffle means includes a plurality of platelike baffles positioned in adjacent relationship along the longitudinal length of said opening means, each of said baffles being swingably mounted on the building, and at least one of said linkages being connected between said drive shaft and each of said baffles.

4. A system according to claim 3, wherein said baffles are hingedly connected adjacent the lower edges thereof to the sidewall of said building along the lower edge of said opening means, means rotatably supporting said drive shaft on the sidewall of said building in the vicinity of the lower edge of said opening means, and each of said linkages including a drive crank fixed to said shaft and a rigid link hingedly connected between said crank and one of said baffles.

5. A system according to claim 4, wherein said motor means comprises a reversible electric motor, and said drive means including a drive mechanism interconnected between said electric motor and said drive shaft, said drive mechanism including a driving crank associated with said electric motor and drivingly interconnected to a driven crank which is fixedly connected to said drive shaft.

6. A system according to claim 1, wherein said opening means comprises a first horizontally elongated opening formed in and extending longitudinally along one sidewall of the building adjacent the upper end thereof and a second horizontally elongated opening disposed opposite the first opening and formed in and extending longitudinally along the opposite sidewall of the building adjacent the upper edge thereof, said baffle means including first and second baffles respectively disposed adjacent the first and second openings, said drive means being connected to said first and second baffles for causing opening and closing movement thereof, and said fan means including fans associated with each of the opposed sidewalls to provide for flow of air between the lower region of the confinement space and the atmosphere outside of the building.

7. A system according to claim 1, wherein said opening means comprises a horizontally elongated opening formed in the sidewall of the building adjacent the upper end thereof, said baffle means being horizontally elongated and extending throughout the length of said opening means, said baffle means including at least one plate-like baffle member hingedly connected along one horizontally extending edge thereof to said building, said drive means including a horizontally elongated shaft rotatably supported on said building in the vicinity of said opening and extending longitudinally thereof and a plurality of identical linkages disposed in parallel relationship and drivingly connected between said shaft and said baffle means, said linkages being spaced from one another and connected to the shaft at locations which are spaced axially along the length thereof, and said motor means comprising a reversible electric motor drivingly connected to said shaft for rotating same.

8. A system according to claim 1, wherein said first means comprises a first pressure sensor positioned within said confinement space, wherein said second means comprises a second pressure sensor disposed outside the building, and said control means including an actuator moved in response to the differential in pressure sensed by the first and second pressure sensors.

9. A system according to claim 8, wherein said control means includes switch means, said actuator comprising a movable diaphragm associated with said last-mentioned switch means, and said first and second pressure sensors being connected by conduits to the opposite sides of said diaphragm.

10. A improved ventilation system for an agricultural building having a livestock confinement space therein, comprising:

air flow means for permitting air flow to said confinement space from the atmosphere outside the building, said air flow means including opening means in said building for permitting communication between said atmosphere and the upper region of said confinement space;

said opening means comprises a first horizontally elongated opening means formed in and extending longitudinally along one sidewall of the building adjacent the upper edge thereof and a second horizontally elongated opening means disposed opposite the first opening means and formed in and extending longitudinally along the opposite sidewall of the building adjacent the upper edge thereof;

said air flow means also including first and second movable baffle means respectively disposed adjacent said first and second opening means and movable for opening and closing said opening means, each said baffle means being movable between a first position wherein said opening means is closed and a second position wherein said opening means is at least partially uncovered;

drive means connected to said first and second baffle means for moving same between said first and second positions, said drive means including motor means and link means connected between said motor means and said baffle means, said link means being capable of transmitting both tensile and compressive loads therethrough to positively control both the opening and closing movement of said baffle means;

sensing means including first pressure sensor means positioned centrally within said confinement space and spaced from said sidewalls for sensing the pressure of the air within said confinement space and second pressure sensors means positioned outside the building for sensing the pressure of the atmosphere outside the building;

control means directly responsive to the pressure differential sensed by said first and second pressure sensor means for causing energization of said drive means when the sensed pressure differential deviates from a preselected differential to cause opening or closing movement of said baffle means, said control means including an actuator moved in response to the differential in pressure sensed by the first and second pressure sensor means; and first and second fan means providing for the flow of air from the lower region of confinement space into the atmosphere outside of said building, said first and second fan means being mounted on said one sidewall and said opposite sidewall respectively, whereby said fan means and said opening means cause a circuitous movement of air through said building with air flowing inwardly through the opposed first and second opening means into the upper central part of the building, the air then flowing downwardly in the central part of the building and then sidewardly in opposite directions for discharge by said first and second fan means.

11. A system according to claim 10, wherein each of said first and second fan means includes first and second fans mounted in the respective sidewall of the building for withdrawing air from the confinement space, and switch means associated with said first and second fans for causing operation of only said first fan when the temperature in said confinement space is relatively low and for causing simultaneous operation of both of said first and second fans when the temperature in said confinement space is relatively high.

* * * * *